(12) United States Patent
Proteau

(10) Patent No.: US 11,802,011 B2
(45) Date of Patent: Oct. 31, 2023

(54) TRANSPORTABLE SIDE-ACCESS CARGO CONTAINER WITH A CONTROLLABLY DEPLOYABLE SECOND FLOOR

(71) Applicant: HomeWorks Restoration Inc., Calgary (CA)

(72) Inventor: Johnny Proteau, Calgary (CA)

(73) Assignee: HOMEWORKS RESTORATION INC., Calgary (CA)

(*) Notice: Subject to any disclaimer, the term of this patent is extended or adjusted under 35 U.S.C. 154(b) by 24 days.

(21) Appl. No.: 17/314,915

(22) Filed: May 7, 2021

(65) Prior Publication Data

US 2021/0347586 A1 Nov. 11, 2021

Related U.S. Application Data

(60) Provisional application No. 63/022,096, filed on May 8, 2020.

(51) Int. Cl.
*B65G 67/04* (2006.01)
*B66F 19/00* (2006.01)
*B65D 88/54* (2006.01)

(52) U.S. Cl.
CPC ........... *B65G 67/04* (2013.01); *B65D 88/542* (2013.01); *B66F 19/00* (2013.01)

(58) Field of Classification Search
CPC ......... B65D 88/542; B60P 3/34; B65G 67/04; B66F 19/00
See application file for complete search history.

(56) References Cited

U.S. PATENT DOCUMENTS

| 4,801,229 A * | 1/1989 | Hanada ..................... B60P 3/08 410/26 |
| 5,836,636 A * | 11/1998 | Adams ............... B65D 90/0053 414/679 |
| 2015/0069781 A1* | 3/2015 | Wegkamp ................. B60P 3/34 296/171 |
| 2015/0232134 A1* | 8/2015 | Lavmand .................. B60P 1/02 414/679 |
| 2019/0210674 A1* | 7/2019 | Deal ..................... B65D 88/542 |
| 2020/0180491 A1* | 6/2020 | Das ........................ B62D 63/08 |
| 2021/0261036 A1* | 8/2021 | Bell ....................... B62D 33/04 |

* cited by examiner

*Primary Examiner* — Kaitlin S Joerger
(74) *Attorney, Agent, or Firm* — Billion & Armitage

(57) ABSTRACT

Disclosed are transportable containers for mounting onto a rearward portion of the frame of a semi-truck comprising. The transportable containers may have a frame comprising: a first wall; a second wall opposing the first wall; two opposed lateral walls extending between the first side and the second side, at least one of the lateral walls comprising an opening formed therein; a top extending over the first wall, the second wall, and the two lateral walls; a second floor contained within an internal space of the frame, the second floor being controllably deployable between a lowered position and a raised position; and a loading ramp hingedly attached to a base of the at least one lateral side having the opening formed therein.

12 Claims, 8 Drawing Sheets

TRANSPORTABLE SIDE-ACCESS CARGO CONTAINER WITH A CONTROLLABLY DEPLOYABLE SECOND FLOOR

TECHNICAL FIELD

This disclosure generally relates to vehicle-mountable cargo containers. More specifically, this disclosure pertains to cargo containers having a deployable second floor for mounting onto rearward sections of the frames of semi-trucks.

BACKGROUND

Semi-trucks are commercially used throughout, for example, North America, Europe, Australia, and the United Kingdom, for the domestic and/or international transport of goods. Semi-trucks are known by a variety of regional names. For example, semi-trucks may also be known as "semis", "big rigs", "eighteen-wheelers", or "tractor trailers". Semi-trucks may have a "conventional" cab and engine arrangement, wherein the engine is located in front of the cab, or a "cabover engine" arrangement, wherein the cab is located on top of or next to the engine. North America generally allows for semi-trucks and their trailers to have a longer maximum length and, as a result, the conventional cab and engine arrangement is more common than the cabover engine arrangement. In contrast, Europe has a legal maximum total length for semi-trucks and their trailers that is less than that of North America. Consequently, the semi-trucks in Europe almost exclusively use a cabover engine arrangement, as this arrangement produces a shorter truck.

Trailers are generally coupled to semi-trucks using a fifth-wheel coupling, which allows the semi-truck to tow the trailer while being rotatable relative thereto. Fifth wheel couplings may comprise a kingpin, which extends downwardly from a front portion of the trailer, and a fifth wheel, which is mounted on the frame of the semi-truck, or on a platform mounted on the frame above the wheels, behind the cab. The fifth wheel may be generally horseshoe-shaped and is adapted to receive the kingpin on the trailer. As well, the fifth wheel is commonly forwardly (i.e. towards the cab) and backwardly (i.e. towards the rear of the truck) adjustable in order to facilitate distribution of weight over the rear axles of the semi-truck.

While semi-trucks are most commonly used for commercial purposes, they may also be used for a variety of recreational activities. For example, semi-trucks may be used to haul fifth-wheel type recreational vehicles (RVs), which are adapted to use the previously described fifth-wheel coupling. Such RVs may be relatively large as compared to other types of RVs and may have a considerable weight. Thus, it may be convenient to use a semi-truck to tow fifth-wheel type RVs.

Further, often when travelling with an RV, destinations may be remote areas that lend themselves to activities such as dirt biking, ATVing, snowmobiling, or the like. In such situations, it may be desired to transport one or more smaller recreational vehicles in addition to the RV. However, this may be difficult, as such recreational vehicles generally cannot be stored in the RV and thus may require a further trailer coupled to the RV. Adding a further trailer may make travelling difficult, as the semi-truck, RV, and additional trailer may have a significant length as well as two pivot points, the combination of which may be challenging to manage while driving.

As well, it will be appreciated that semi-trucks may be relatively fuel-inefficient and may be difficult to maneuver in confined areas. Thus, it may also be desirable to transport a smaller road-ready vehicle in addition to the RV. In some cases, this may be accomplished by towing the smaller vehicle behind the RV. However, such a set-up may lead to the same issues discussed above in relation to the towing of the smaller recreational vehicles.

SUMMARY

Embodiments of the present disclosure generally relate to transportable containers for mounting onto rearward sections of the frames of semi-trucks. The transportable containers may be mounted between the cab and the fifth wheel of the semi-truck.

Some aspects relate to a transportable container for mounting onto a rearward section of a frame of a semi-truck comprising: a frame comprising: a first wall; a second wall opposing the first wall; two opposed lateral walls extending between the first side and the second side, at least one of the lateral walls comprising an opening formed therein; a top extending over the first wall, the second wall, and the two lateral walls; a second floor contained within an internal space of the frame, the second floor being controllably deployable between a lowered position and a raised position; and a loading ramp hingedly attached to a base of the at least one lateral side having the opening formed therein.

Advantageously, the transportable containers of the present disclosure may allow for the loading of multiple smaller recreational vehicles such as ATVs, dirt bikes, snow mobiles, or the like. This may be accomplished through the use of a controllably deployable second floor within the transportable container, which is capable of raising one or more smaller recreational vehicles so that additional smaller recreational vehicles may be stored thereunder. As well, the controllably deployable second floor may be configured such that a smaller road-ready vehicle may be raised within the transportable container. This may allow multiple smaller road-ready vehicles to be loaded at once. Alternatively, the controllably deployable second floor may be instead used to increase the storage capacity of the transportable container. For example, the cargo may be loaded on the second floor and subsequently raised within the transportable container so that additional cargo, a smaller recreational vehicle, or a smaller road-ready vehicle may be stored thereunder. Further, if taller cargo is intended to be transported, the second floor may simply be lowered to its lowest position in order to increase the headspace within the transportable container.

Further advantages will become apparent to those of ordinary skill in the art upon reading the present disclosure.

BRIEF DESCRIPTION OF THE FIGURES

The embodiments of the present disclosure will be described with reference to the following drawings in which.

DETAILED DESCRIPTION

The embodiments of the present disclosure generally relate to transportable, cargo containers that are mountable onto rearward sections of the frames of semi-trucks. More specifically, the embodiments of the present disclosure relate to transportable, side-accessible cargo containers that have a controllably deployable second floor.

As used herein, "semi-truck" is intended to refer to a truck capable of receiving, coupling to, and towing a trailer unit. Generally, semi-trucks may have a cab, an engine, a transmission system, a brake-control system, a fuel tank, a plurality wheels mounted on a plurality of axels, and frame rails that extend outwardly from the cab and behind the truck. The semi-trucks may have two or three axels, with a first axel located either before the cab (in the case of a conventional arrangement) or below the cab (in the case of a cabover arrangement), and one or more rear axles mounted below the frame rails, behind the cab. A person of ordinary skill in the art is familiar with semi-trucks and their various configurations.

The semi-truck may receive and couple to the trailer unit, for example, by way of a fifth wheel mounted on the frame rails behind the cab of the truck. As used herein "fifth wheel" is intended to encompass a device configured to receive a kingpin from the trailer unit. The fifth wheel may be a metal disk having a slot for slidably receiving and coupling to the kingpin. Alternatively, the fifth wheel may be generally horseshoe-shaped. The fifth wheel is typically mounted on the frame rails behind the cab of the semi-truck. The fifth wheel may be mounted directly on the frame rails or may instead be located on a horizontal platform extending over the frame rails. As well, the position of the fifth wheel may be linearly adjustable (i.e. forwardly towards the cab and backwardly towards the rear of the truck). A variety of fifth wheel configurations are known in the art and are contemplated for use in the present disclosure.

As discussed above, the trailer unit may couple to the fifth wheel of the semi-truck by way of a kingpin. As used herein "trailer unit" is intended to refer to a vehicle that is towable by the semi-truck previously described herein. For example, a trailer unit may be a semi-trailer, an RV, a platform trailer, or the like. Further, as used herein "kingpin" is intended to mean a vertical bolt extending downwardly from a front portion of the trailer unit. As will be appreciated by those of ordinary skill in the art, standard kingpin sizes include those having a diameter of 2 in (50.8 mm) or 3.5 in (88.9 mm).

Reference will now be made in detail to example embodiments of the present disclosure, wherein numerals refer to like components, examples of which are illustrated in the accompanying figures.

Figure 1:
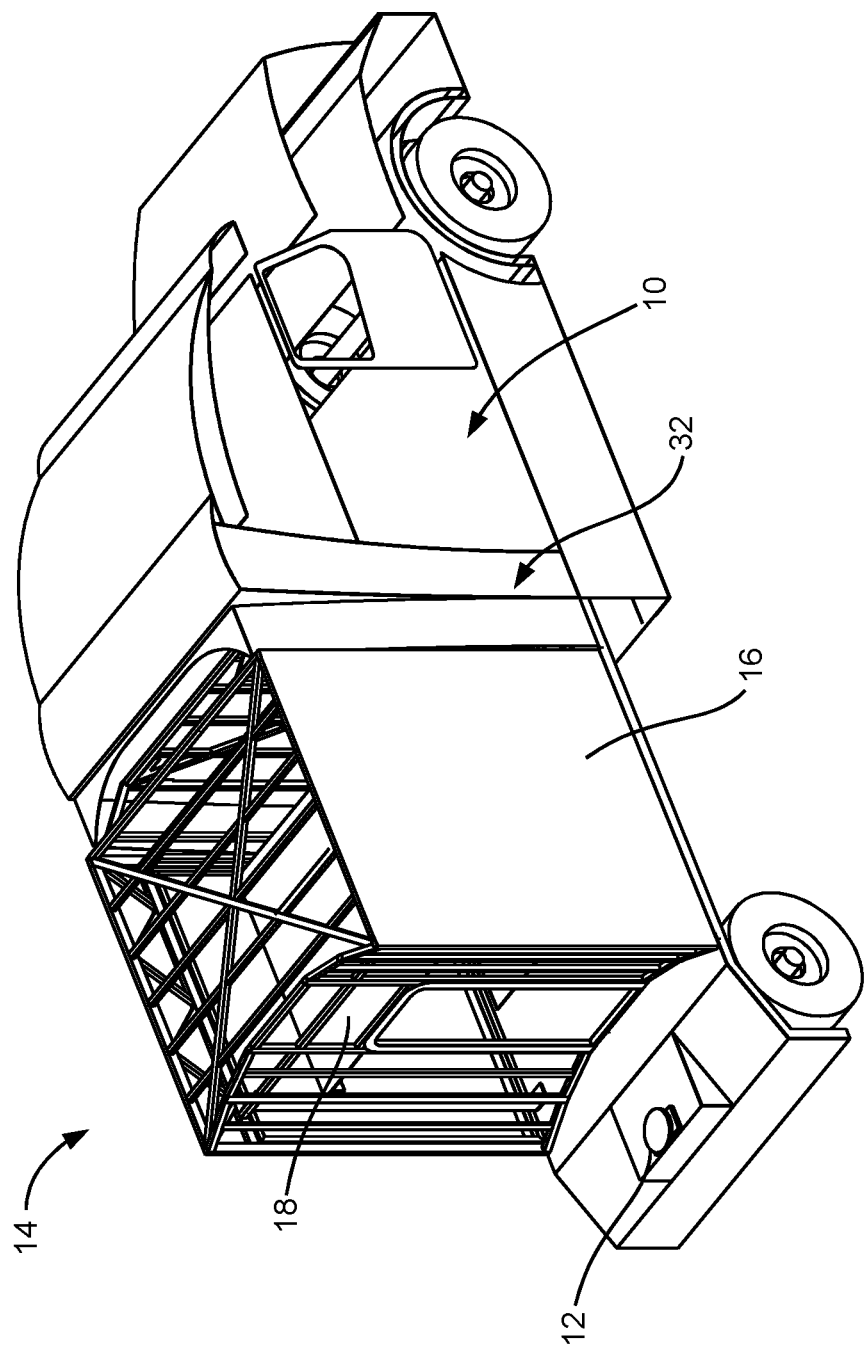
FIG. 1 is a perspective view of a container in an embodiment of the present disclosure mounted onto a semi-truck, wherein a ramp for accessing the container is in a closed position.
Figure 2:
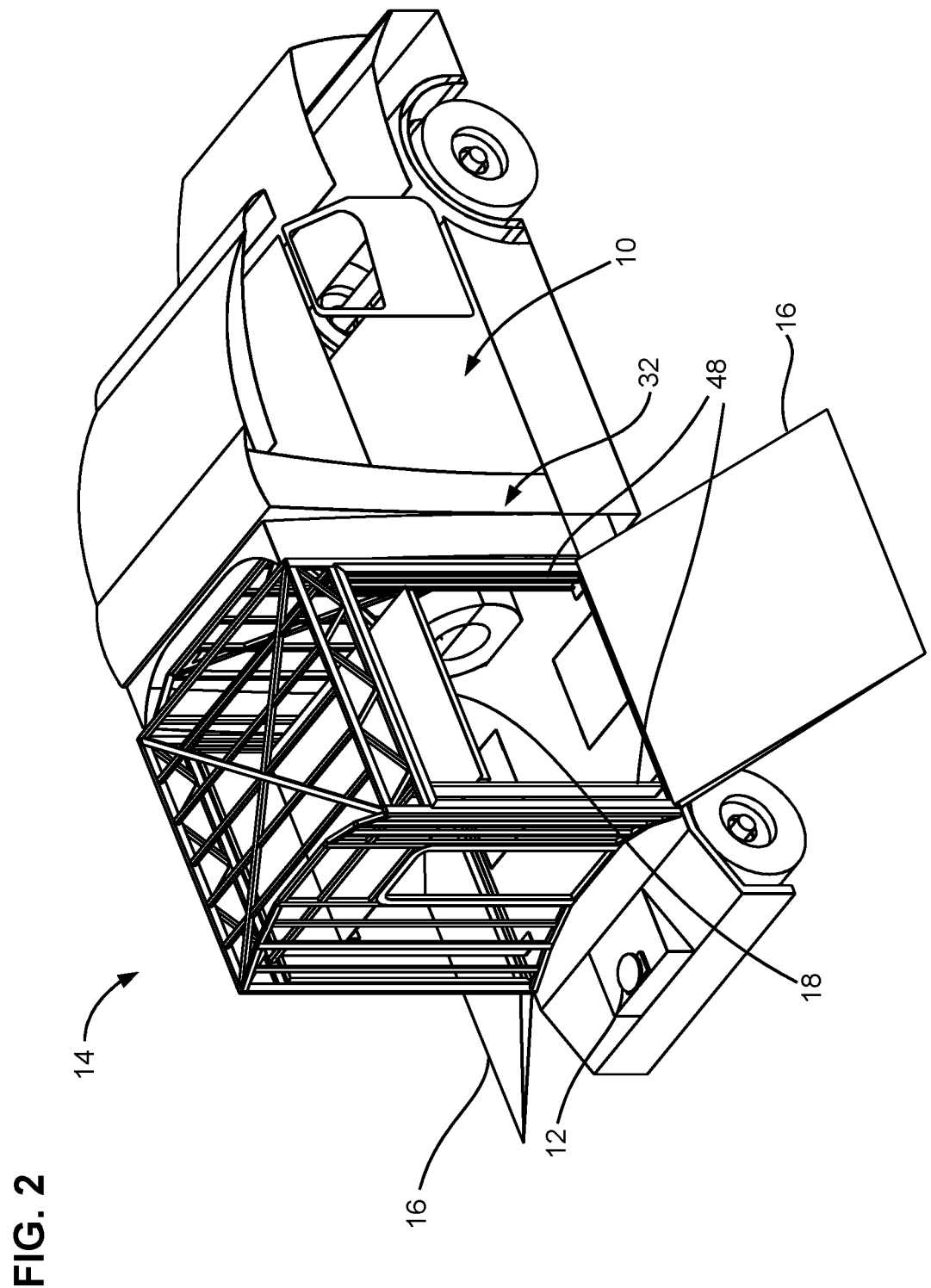
FIG. 2 is a perspective view of a container in an embodiment of the present disclosure mounted onto a semi-truck, wherein a ramp for accessing the container is in an open position.

An example embodiment of the present disclosure is illustrated in FIG. 1. As can be seen in FIGS. 1 and 2, the transportable containers of the present disclosure may be mountable onto rearward sections of the frames of semi-trucks—i.e. on the frame rails extending away from and behind the cab of the semi-truck. In the illustrated example, a transportable container 14 of the present disclosure may be mounted onto a rearward section of the frame of a semi-truck between a cab 10 of the semi-truck and a fifth wheel 12 of the semi-truck. Further, as shown in the illustrated example, the transportable container 14 may have one or more loading ramps 16 and a controllably deployable second floor 18. These features will be described in more detail below.

Figure 3:
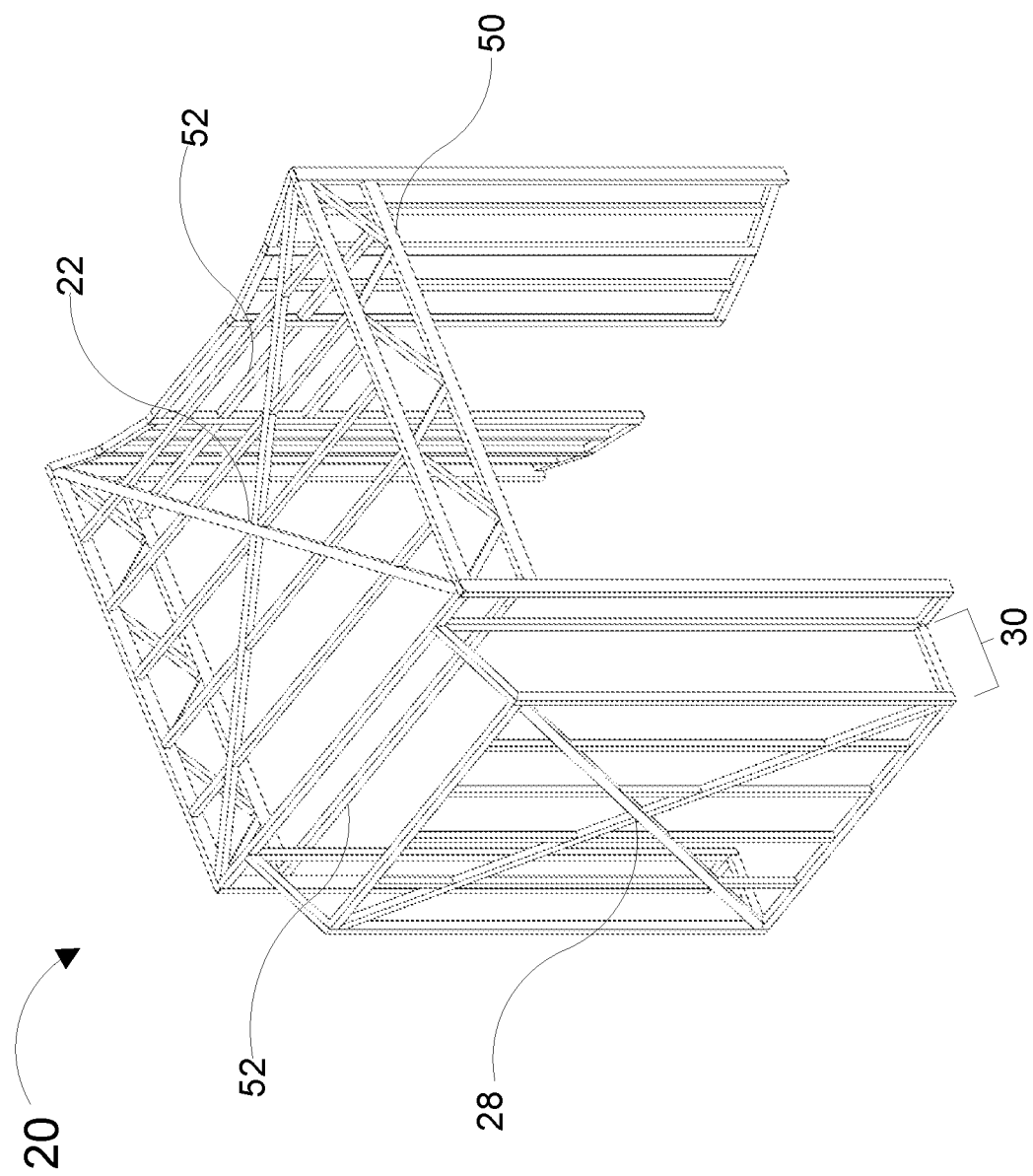
FIG. 3 is a perspective view of a container in an embodiment of the present disclosure.

According to an embodiment, the transportable container 14 may comprise a frame such as a frame 20 illustrated in FIG. 3. In an aspect, the frame 20 may have a generally cuboid shape. In an aspect, the frame 20 may comprise a plurality of walls defined by a plurality of support beams. In one aspect, the support beams may be formed of a metal or metal alloy, such as steel or an aluminum-containing alloy. The support beams may be fixed to one another by way of suitable fasteners (e.g. metal bolts, nuts, screws, and the like) or by way of welding. The plurality of support beams may include horizontal beams that define top and bottom edges of each wall of the frame as well as vertical support beams that define vertical edges of each wall of the frame. As well, the plurality of support beams may include beams that extend perpendicularly between the top and bottom edges of the walls of the frame 20, and/or beams that extend between diagonally opposed corners of the walls of the frame 20 (i.e. in a cross-beam formation). In an aspect, the frame 20 may have a height of about 100 in (254 cm) to about 120 in (304.8 cm). In a further aspect, the frame 20 may have a length of about 90 in (228.6 cm) to about 100 in (254 cm). In a still further embodiment, the frame 20 may have a width of about 90 in (228.6 cm) to about 100 in (254 cm). In a particular aspect, the frame 20 may have a height of about 112 in (284.5 cm), a length of about 96 in (243.8 cm), and a width of about 98 in (248.9 cm).

In a further aspect, the frame 20 may be finished with sheets of a metal or a metal alloy to form the transportable container 14. By "finishing" it is meant that the frame 20 may have a material fixed to the sides thereof to protected the internal space from external elements (e.g. rain). In one aspect, the frame 20 may be finished with steel sheets or sheets of an aluminum containing alloy. The finishing may be an external and/or an internal finish. Further, in some aspects, the frame 20 may be insulated prior to finishing. In such aspects, the frame may be packed with insulation (e.g. fiberglass) prior to finishing. However, in some aspects, the frame 20, and therefore the transportable container 14, may remain unfinished.

Figure 6:
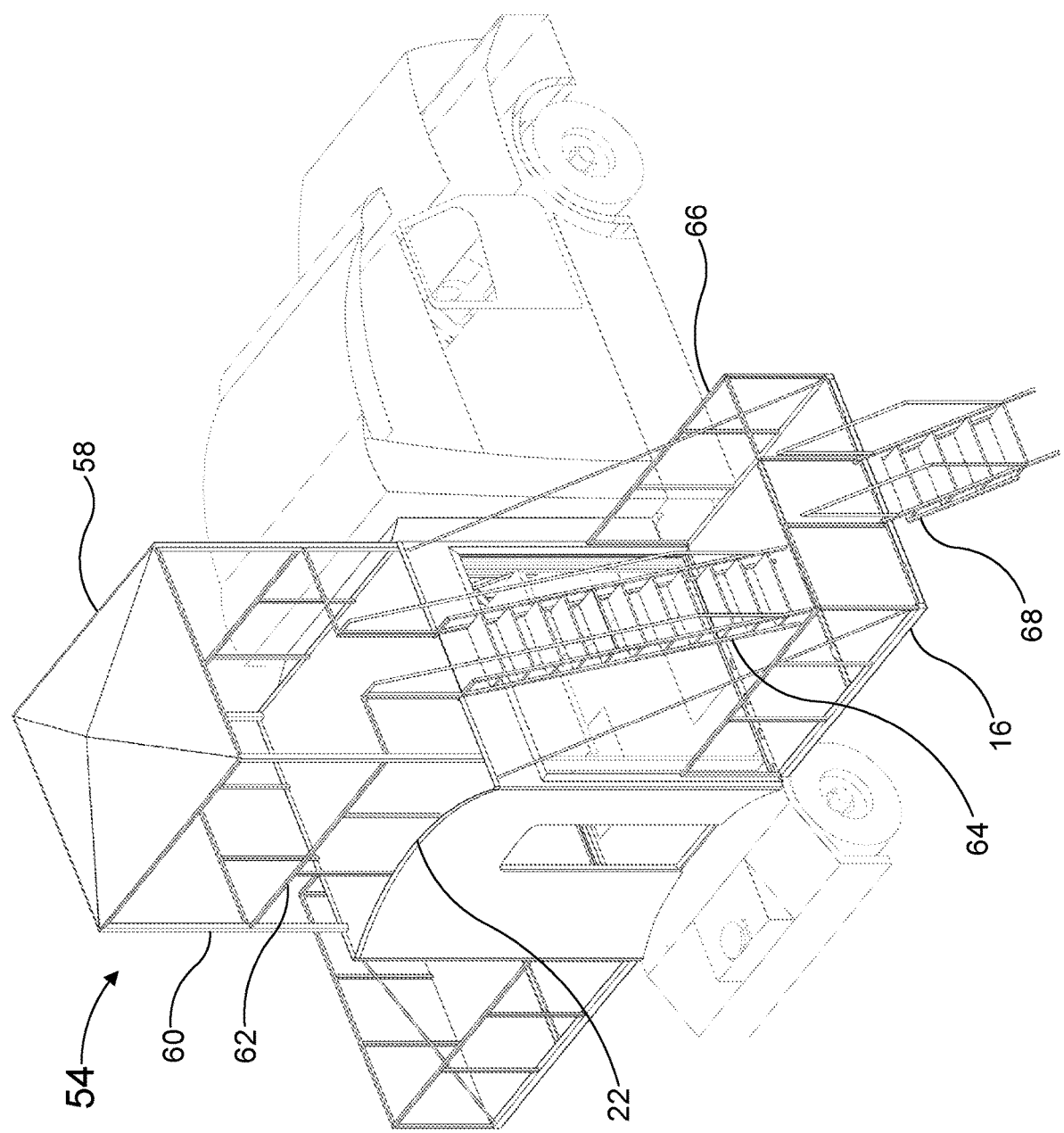
FIG. 6 is a perspective view of a container in an embodiment of the present disclosure mounted onto a semi-truck.

According to a further embodiment, the frame 20 may comprise a top 22. The top 22 may be defined by top edges of each of the walls of the frame 20. In an aspect, the top 22 may comprise a plurality of support beams in the configurations or the combination of configurations previously described herein in relation to the frame 20. In an aspect, the top 22 may comprise additional storage space thereon or, alternatively, may be configured for recreational use. In such aspects, the top 22 may comprise upper walls extending vertically from the top edge of each of the walls of the frame 20, thereby defining an upper level 54. In one aspect, the upper walls may be configured in the same manner as the walls of the frame 20. In another aspect, such as illustrated in FIG. 6, the top 22 may be configured to receive posts 60 proximal each corner thereof, thereby defining the upper walls. In such aspects, the posts 60 may have a railing 62 extending therebetween. The posts 60 and the railing 62 may be made of a metal such as aluminum, steel, or the like.

The upper level may also comprise a roof 58 extending over the upper level 54 and perpendicularly from each of the walls (e.g. posts 60 and railing 62) thereof. The roof 58 may be flat, pointed, gabled, or the like. In the embodiment illustrated in FIG. 6, the roof 58 is pointed. Further, the roof 58 may be a material such as a metal (e.g. aluminum), fabric (e.g. polyester), etc. In one aspect, the roof 58 is detachable from the upper walls.

According to a further aspect, the upper walls (e.g. posts 60 and railing 62) and roof 58 may be configured for disassembly and removal for storing during transit. For example, the upper walls may be releasably secured to the top 22 by way of fasteners (e.g. screws, bolts, and the like), spring-biased fittings, via threading into the top 22, or the like.

In a further aspect, the upper level 54 may extend higher than the top of the cab 10. In such aspects, the total height of the frame 20 may extend beyond 120 in (304.8 cm). For example, in such aspects, the total height of the frame 20 may be up to 240 in (609.6 cm).

Figure 5:
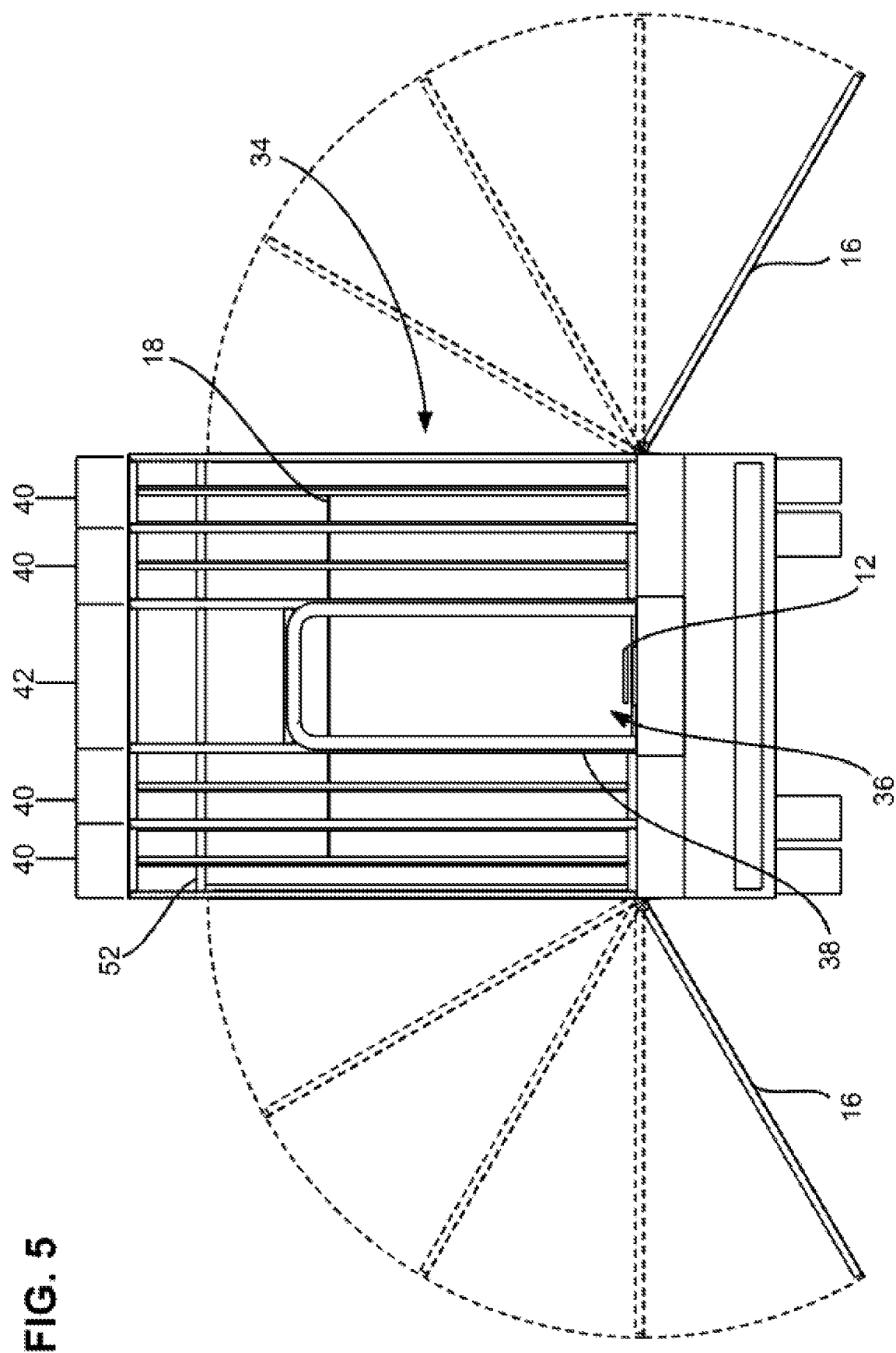
FIG. 5 is a rear view of a container in an embodiment of the present disclosure mounted onto a semi-truck.

In a still further aspect, the upper level 54 may be accessible, for example, through a side wall of the upper level 54 or through the top 22. The upper level 54 may be accessible by way of an opening, a hatch, a small door, or the like. In the illustrated embodiment, the upper level 54 is accessible via an opening in the railing 62. The opening allows access to the upper level 54, for example, by way of a ladder 64 that extends from the upper level 54 to the ground, to a part of the frame 20 (e.g. the one or more loading ramps 16, as shown in the illustrated embodiment), or to the truck deck (e.g. a point proximal the fifth wheel 12). The ladder 64 may be a vertical or inclined, stepped or runged ladder. In FIG. 6, the ladder 64 is an inclined stepped ladder. As well, in one aspect, the ladder 64 may comprise additional safety features such as one or more railings. Further, in some aspects, the ladder 64 may be removable so that it may be stored during transit. In such aspects, the ladder 64 may be releasably secured to the railing 62, as shown in FIG. 5. The ladder 64 may be formed of any suitable material such as aluminum, stainless steel, and the like.

According to a further embodiment, the frame 20 may comprise a base 24. In one aspect, the base may be defined by bottom edges of each wall of the frame 20. According to another aspect, the base 24 may extend beyond the back of the transportable container 14 and over the frame rails and the rear wheels of the semi-truck. In a further aspect, the base 24 may have access portions 26 that allow for access to, for example, storage containers located under the base 24. The access portions 26 may be removable from the base 24 or may be openable by way of, for example, hinges. Further, in another aspect, the base 24 may be made of a metal or metal alloy. In one aspect, the base 24 is steel or an aluminum-containing alloy.

According to alternative embodiment, the frame 20 may not comprise the base 24. In such embodiments, the frame may instead be mounted on a separate, pre-installed truck deck (i.e. a platform extending over the frame rails of the semi-truck). The pre-installed truck deck may have the same features described above in relation to the base 24.

In an embodiment, the frame 20 may comprise a first, front-facing wall 28 which faces the back of the cab 10 of the semi-truck. The front-facing wall 28 may be defined by the plurality of support beams of the frame 20, as described above. According to one aspect, the front-facing wall 28 may be a straight (i.e. flat) wall. According to an alternative aspect, the front-facing wall 28 may have a portion that extends in the direction of the cab 10 in order to form a recess 30 therein, such as in the illustrated embodiment. The recess 30 may serve to provide increased storage space within the transportable container. As well, the recess 30 may be sized such that it complements the back wall of the cab 10 of the semi-truck. For example, as will be appreciated by those of ordinary skill in the art, semi-trucks may have cab-extenders 32 that act to extend the rear edge of the cab 10 in order to inhibit the flow of air into the region between the cab 10 and a trailer unit attached to the semi-truck. The cab-extenders 32 may serve to give the rear wall of the cab 10 a generally arcuate shape and may comprise an outer wall extending in the rearward direction from the back wall of the cab 10 and a curved inner wall extending from the edge of the outer wall to a rear face of the cab 10. Alternatively, the cab-extenders 32 may comprise the outer wall and a curved portion extending perpendicularly from the top of the outer wall to the top of the rear side of the cab 10 to form a lip, such in the illustrated example. Thus, the recess 30 in the front-facing wall 28, in some aspects, may be sized and shaped to fit within the arc formed by the cab-extenders 32. For example, as illustrated in FIG. 3, the top of the recess 30 may sloped downwardly away from the top 22 of the frame 20 in order to fit under the lip extending from the top of the cab 10 formed by the cab-extenders 32.

According to a further embodiment, the frame 20 may comprise a second, rear-facing wall 34, opposite the front-facing wall 28. In an aspect, the rear-facing 34 wall may be a straight (i.e. flat) wall. In some aspects, the rear-facing wall may comprise brake-lights (not shown) mounted on vertical edges thereof. In some aspects, the brake lights may be LED brake lights. In a further aspect, the rear-facing wall 34 may comprise an opening 36 (e.g. a doorway) for allowing a user to access the inside of the transportable container 14. As illustrated in FIG. 5, the opening 36 may be comprised of a frame 38 located generally in the center of the rear-facing wall 34. However, in other aspects, the frame 38 may be located at an off-center position in the rear-facing wall. According to an aspect, the opening 36 may be a size that allows a user to access the inside of the transportable container 14 with relative ease. For example, the opening 36 may have a height of about 70 in (177.8 cm) to about 80 in (203.2 cm). In a further aspect, the width of the opening 36 may be about 25 in (63.5 cm) to about 35 in (88.9 cm). In a particular aspect, the opening 36 may have a height of about 75 in (190.5 cm) and a width of about 30 in (76.2 cm). As well, in some aspects, the opening 36 may comprise a door (not shown) mounted on the frame 38 thereof.

In a further aspect, the rear-facing wall 34 may comprise rear-extenders (not shown) mounted on the vertical sides thereof, to thereby give the rear-facing wall 34 a generally arcuate shape. The rear-extenders may be configured in the same manner and may have the same features as the cab-extenders 32 previously described herein. In such aspects, the brake lights, if present, may be mounted on the rear-extenders.

In an alternative aspect, the rear-facing wall 34 itself may have a generally arcuate shape. In such an aspect, the rear-facing wall 34 may comprise a plurality of wall segments 40 extending from the vertical edges thereof to the center of the rear-facing wall 34, as shown in FIG. 5. The plurality of wall segments 40 may be angled decreasingly inwardly from the vertical edge of the rear-facing wall 34 in order to form a generally arcuate shape. Each wall segment 40 may be defined by a plurality of horizontal and vertical support beams. In an aspect, each wall segment 40 may be defined by top and bottom horizontal support beams and one or more vertical support beams. The horizontal support beams of the wall segments 40 may meet the vertical edges of the rear-facing wall 34 or the horizontal support beams of another wall segment 40 at an angle in order to form an arcuate shape. Further, as will be appreciated, the number of wall segments 40 and the angles at which they meet may be adjusted based on the amount of curvature of the rear-facing wall 34 desired. For example, such as in the illustrated example, the rear-facing wall 34 may comprise two pairs of wall segments 40 that extend inwardly from each of the vertical edges of the rear-facing wall 40 to meet at a central wall segment 42, thereby producing an arcuate shape. Further, in aspects where the rear-facing wall 34 itself is arcuate shape (i.e. not made arcuate by way of rear-extenders) it is noted that the opening 36 previously described herein may form part of the central wall segment 42. As well, it will be appreciated that the opening 36 may have a width that allows for the maintaining of the generally arcuate shape of the rear-facing wall 34, or, alternatively, the frame 38 may also be generally arcuate.

According to a further embodiment, and as previously disclosed herein, the transportable container 14 may be side-accessible. As used herein, "side-accessible" is intended to mean that inside of the transportable container 14 may be accessed from one or both of the left- and right-hand lateral sides of the semi-truck, in addition to any other access points that may be present. In the illustrated example, the transportable container 14 may be side-accessible from both lateral sides of the semi-truck. In other aspects, however, the transportable container 14 may be side-accessible on only one lateral side of the semi-truck.

Figure 4:
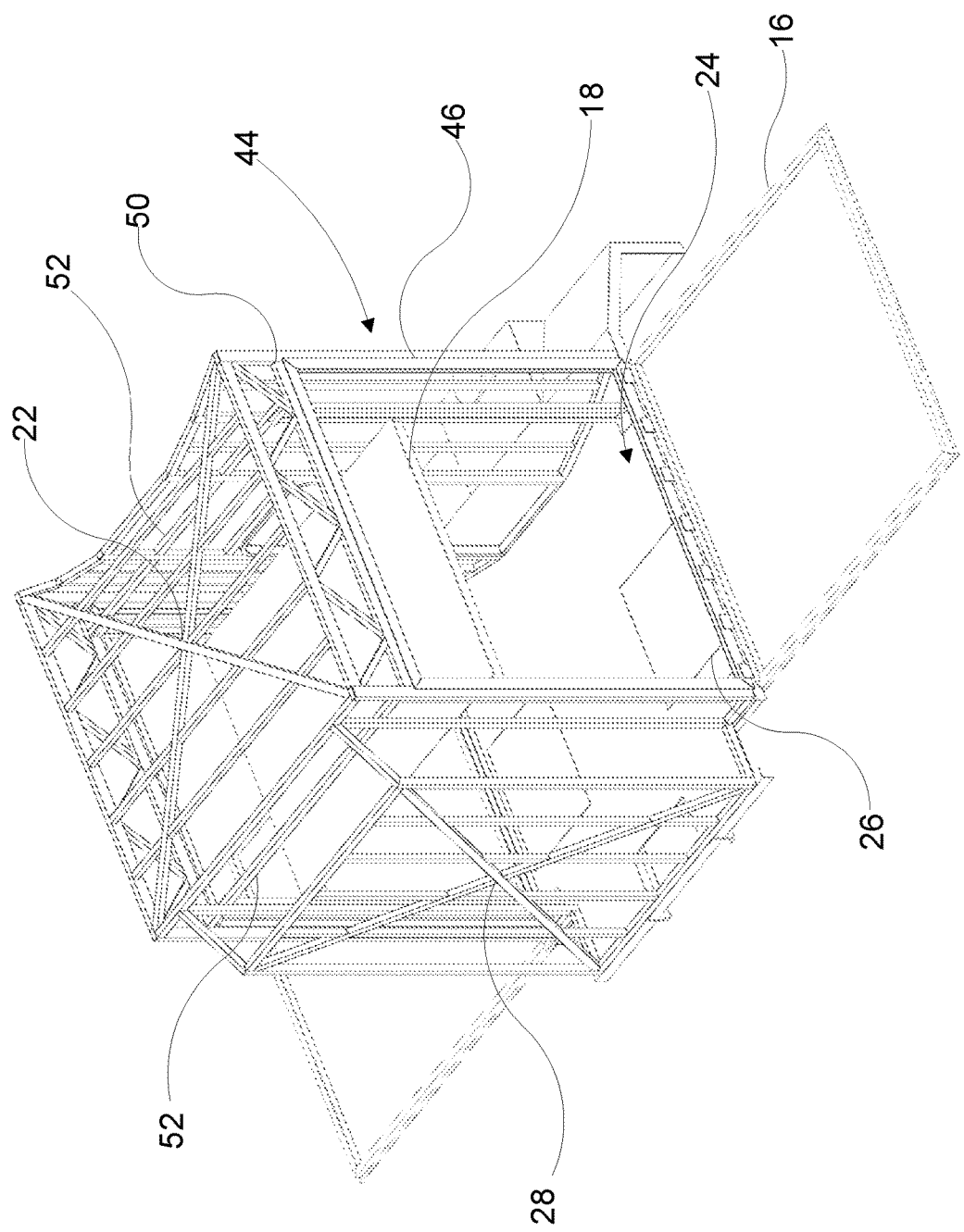
FIG. 4 is a perspective view of a container in an embodiment of the present disclosure.

Thus, according to an embodiment, the frame 20 may comprise one or more side-accessible lateral walls 44. As shown in, for example, FIG. 4, the side-accessible lateral walls 44 may comprise two vertical edges and a horizontal top edge extending therebetween, thereby defining an opening for allowing access to the transportable container 14. In one aspect, the opening has a height and/or a width of about 85 in (215.9 cm) to about 95 in (241.3 cm). In a particular aspect, the opening has a height of about 93 in (236.2 cm) and a width of about 91 in (231.1 cm).

Further, in another aspect, such as the illustrated example, the side-accessible lateral walls 44 may also comprise a dropped horizontal beam 50 also extending between the two vertical edges. The dropped horizontal beam 50 may be included to provide additional structural support to the frame 20 of the transportable container 14. As shown in the illustrated example, a plurality of support beams may extend from the dropped horizontal beam 50 to the top edge of the side-accessible lateral wall 44. The plurality of support beams may be configured as described above in relation to the frame 20 or may, alternatively, extend from the second horizontal beam to the top edge the side-accessible lateral wall 44 at an angles of about 45° or about 135° in order to form a "zig-zag" pattern. As well, the side-accessible lateral walls 44 may comprise an additional frame 46, which fits within the two vertical edges and the dropped horizontal beam 50 of the side-accessible lateral wall 44 as well as and the truck deck or, if present, the base 24. Thus, in one aspect, the additional frame 46 may have a square or rectangular shape, having a side that is in contact with or fixed to each of the two vertical edges and the dropped horizontal beam 50 of the side-accessible lateral wall 44 as well as the truck deck or, if present, the base 24.

According to one embodiment, each side-accessible lateral wall 44 may comprise a loading ramp 16. In one aspect, such as the illustrated example, the ramp 16 may be hingedly connected to a base edge of the additional frame 46 that is in contact with or fixed to the truck deck or the base 24, as previously described herein. However, in other aspects, such as when the side-accessible lateral side 44 may not include the additional frame 46, the ramp 16 may be hingedly connected to the base 24, if present. The ramp 16 may be hingedly connected such that it may be moveable between a first, closed position and a second, open position. In the closed position, the ramp 16 extends upwardly, thereby blocking access to the inside of the transportable container 14. In this position, the ramp 16 may simply extend in front of the opening in the side-accessible lateral wall 44 in order to block access thereto, or may instead be received by, for example, the additional frame 46 such that the ramp 16 is flush with the side-accessible lateral wall 44. In the open position, the ramp 16 is deployed such that one end thereof is in contact with an external surface (e.g. the ground) in order to allow ramped access to the inside of the transportable container 14.

In a further aspect, the ramp 16 is made of a metal or metal alloy, such as steel or an aluminum-containing alloy. In a yet further aspect, the ramp 16 is flat. In an alternative aspect, the ramp 16 is tapered away from an end thereof that is hingedly connected to the base edge of the additional frame 46 or the base 24, such as illustrated in FIG. 2.

Further, as illustrated in FIG. 6, the ramp 16 may be configured to receive a railing 66. The railing 66 may be configured in the same manner as described above in relation to the railing 62. For example, the railing 66 may comprise an opening for accessing the ramp 16. The opening may be accessed, for example, by way of a ladder 68. The ladder 68 may be configured in the same manner described above in relation to the ladder 64. In some aspects, the ladder 68 may facilitate maintaining the ramp 16 at a level, horizontal position.

Figure 7:
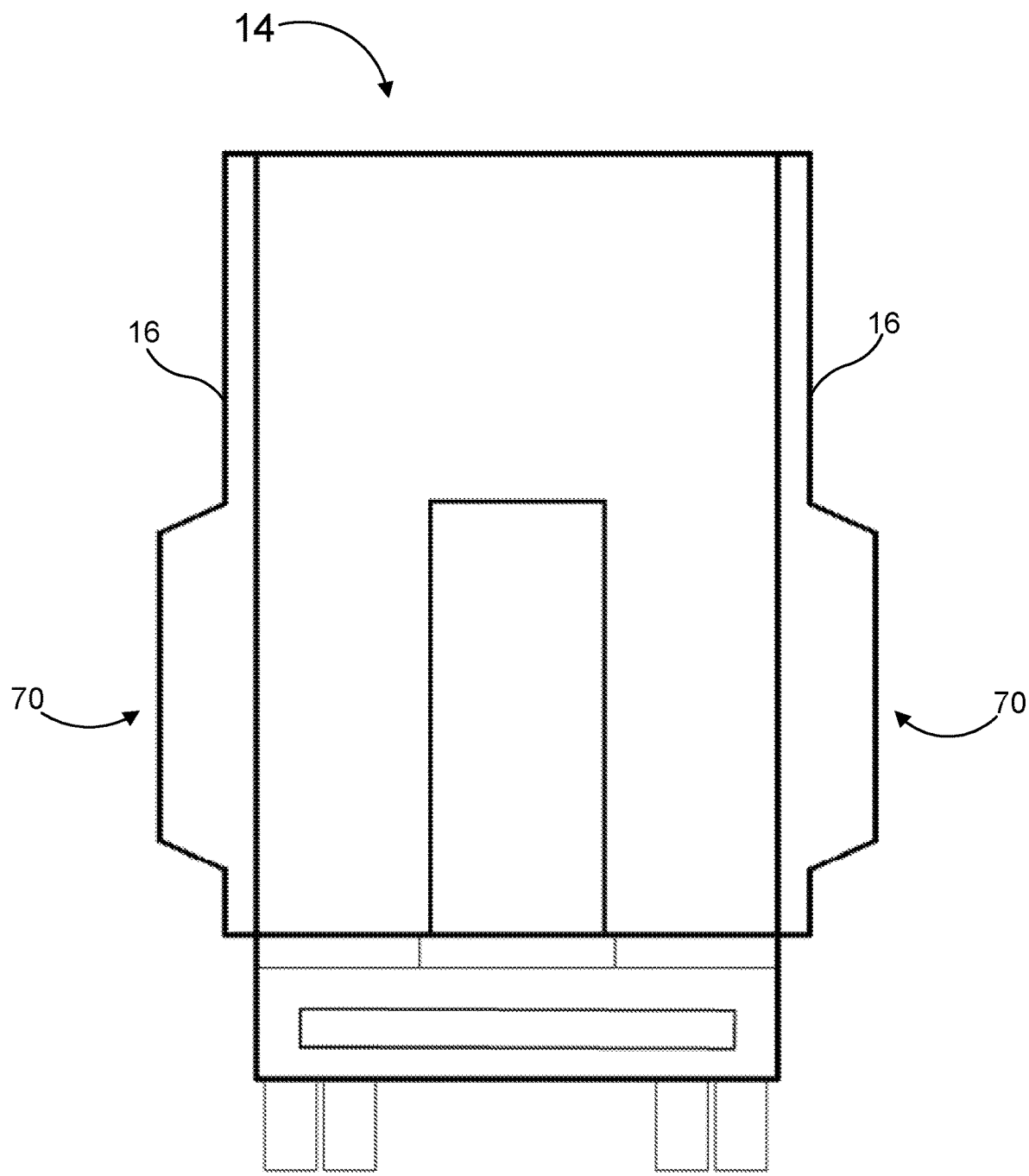
FIG. 7 is a rear view of a container in an embodiment of the present disclosure mounted on a semi-truck.
Figure 8:
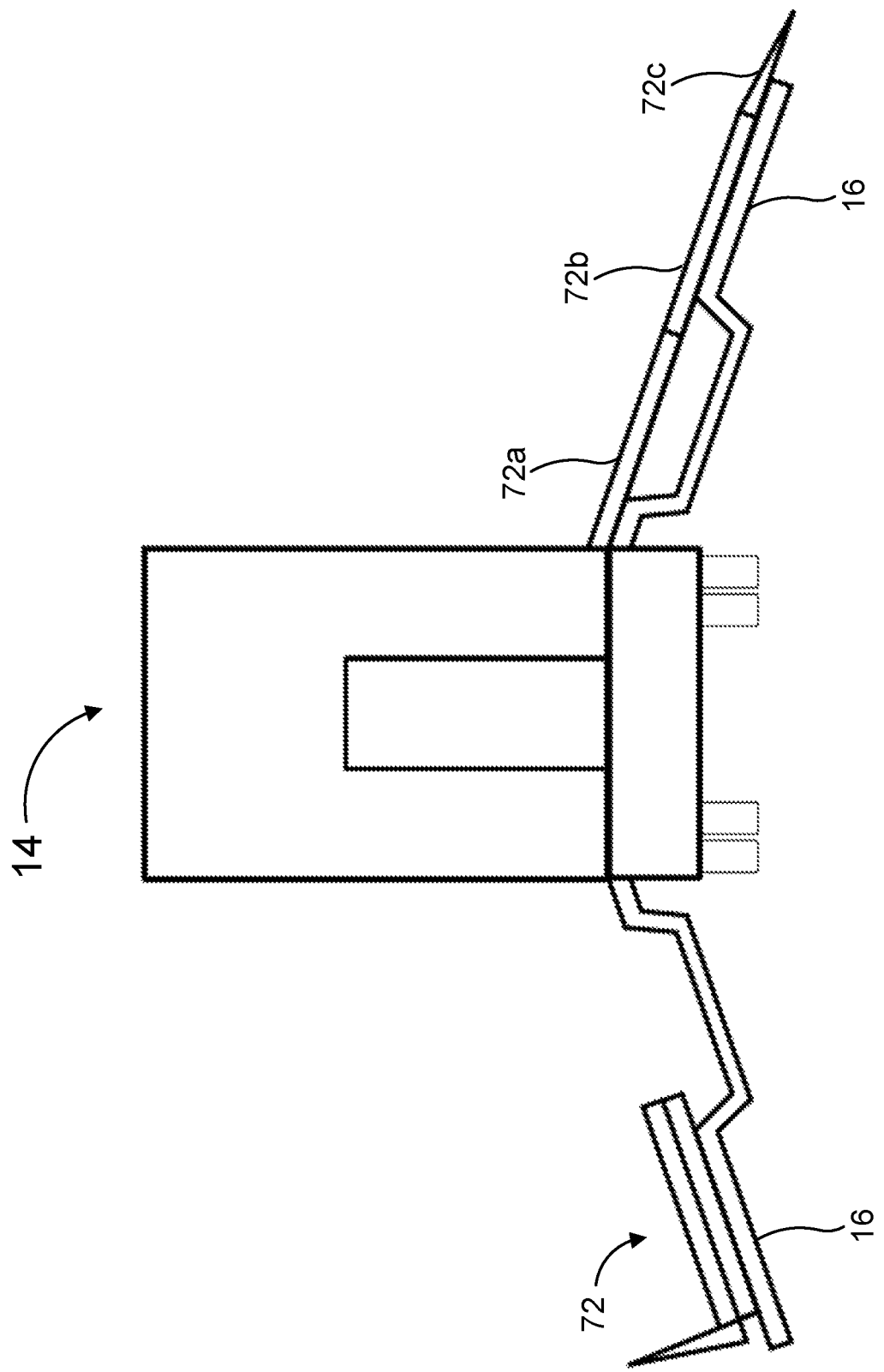
FIG. 8 is a rear view of the embodiment illustrated in FIG. 7 with ramps for accessing the container in an open position.

In a further embodiment, the ramp 16 may comprise a bump-out 70 therein to accommodate cargo that is longer than the width of the transportable container 14. As illustrated in FIGS. 7 and 8, the bump-out 70 extends from, and across the width of, an outward-facing surface of the ramp 16 to thereby provide increased space within the transportable container 14 when the ramp 16 is in a closed position. According to one aspect, the bump-out 70 has a depth of about 1 inch (2.52 cm) to about 6 inches (15.24 cm). As will be appreciated, the depth of the bump-out 70 corresponds to amount of space provided thereby to the transportable container 14 when the ramp 16 is in the closed position. Further, the bump-out 70 may be positioned in the ramp 16 such that the bottom of the bump-out 70 is proximal the hinge of the ramp 16. In some aspects, of the hinge of the ramp 16 may be at the bottom of the bump-out 70. In other aspects, the bump-out 70 may be about 1 inch (2.54 cm) to about 10 inches (25.4 cm) above the hinge of the ramp 16.

Further, in such embodiments, the ramp 16 may comprise a cover 70 for covering the bump-out 70 when the ramp 16 is an open position to thereby facilitate the loading or de-loading of the transportable container 14. As illustrated in FIG. 8, the cover 70 may be deployed over the bump-out 70 of the ramp 16 to provide a flat ramp for accessing the inside of the transportable container 14. The cover 70 may be detachable from the ramp 16 for storage or, alternatively, may be mountable on the ramp 16 and collapsible to reduce the footprint thereof when the ramp 16 is in the closed position, as shown in FIG. 8. In aspects, where the cover 70 is collapsible, the cover 70 may comprise a plurality of portions 70*a*, 70*b*, and 70*c* hingedly connected to each other in series. In FIG. 8, the cover 70 comprises three portions 70a, 70b, and 70c but, as will be appreciated, the cover 70 may comprise fewer or more portions. The cover 18 may be formed out of the same material as the ramp 16 or a different material (e.g. a different metal).

As discussed above, according to some embodiments both lateral sides of the frame may be configured to allow access to the transportable container 14. However, according to other embodiments, only one of the lateral sides may be configured to allow access to the transportable container 14. In such embodiments, a lateral side that is not configured to allow access to the transportable container may comprise a plurality of support beams configured in the same manner as described above in relation to the frame 20. In one aspect, the lateral side may also comprise the dropped horizontal beam 50 previously described herein in relation to the side-accessible lateral wall 44, which may provide additional support to the frame 20. In such an aspect, the plurality of support beams may extend from the bottom horizontal edge of the lateral wall to the dropped horizontal beam 50. Further, in aspects where the lateral walls of the frame 20 each comprise the dropped horizontal beam 50, the frame 20 may comprise an additional support beam 52 extending therebetween. The additional support beam 52 may provide additional structural support to the frame 20. As well, in some aspects, such as in the illustrated example, the central wall segment 42 of the rear-facing wall 34 may intersect with the additional support beam 52 in order to provide additional structural support to the rear-facing wall 34.

In a yet further embodiment, the transportable container 14 may comprise a deployable second floor 18 located within the transportable container 14. The deployable second floor 18 may be controllably moved upwards or downwards within the transportable container 14. The deployable second floor 18 may be moveable between a first, lowered position, and a second raised position. In the lowered position, the second floor 18 is located adjacent to the base 24 or at the truck deck. In an aspect, the second floor 18 has a lip to receive the additional frame 46 of the side-accessible lateral walls 44 previously described herein. The lip may allow for the second floor 18, when in the lowered position, to be flush with the additional frame 46 and the ramp 16 when in the open position, thereby providing easier access to the inside of the transportable container 14. In the raised position, the second floor 18 is elevated above the base 24 or the truck deck, thereby providing a second level within the transportable container 14. As well, in aspects where two additional support beams 52 are present, the second floor 18 may be received by the additional support beams 52 when raised to its maximum height.

In an aspect, the second floor 18 is deployable by way of a hoist system 48. For example, in one aspect, the hoist system 48 may be a two- or four-post hydraulic hoist system. In the example embodiment illustrated in FIGS. 2 and 4, the hoist system 48 is a four-post hydraulic hoist system. The hoist system 48 may be secured to the base 24, if present, or to the truck deck. In a further aspect, the hoist system may also be secured to the additional support beam or beams 52. In such aspects, the hoist system may also provide structural support to the frame 20. However, as will be appreciated by those of ordinary skill in the art, a variety of types of hoist systems may be suitable for use in the transportable container 14 of the present disclosure. In some aspects, the hoist system 48 is a commercially available hoist system that has been adapted to raise and lower the second floor 18 of the present disclosure. In one aspect, the weight of the hoist system 48 may be up to about 500 lbs (226.8 kg). In a further aspect, the hoist system 48 is capable of deploying the second floor 18 up to a maximum height of about 60 in (152.4 cm) to about 75 in (190.5 cm). In a yet further aspect, the hoist system 48 is capable of deploying the second floor 18 while carrying cargo weighing about 2000 lbs (907.2 kg).

Although the foregoing disclosure has been described in some detail by way of illustration and example for purposes of clarity of understanding, it is readily apparent to those of ordinary skill in the art in light of the teachings of this disclosure that certain changes and modifications may be made thereto without departing from the spirit or scope of the appended claims.

The invention claimed is:

1. A transportable container for mounting onto a rearward section of a frame of a semi-truck comprising:
    a frame comprising:
        a first wall;
        a second wall opposing the first wall;
        two opposed lateral walls extending between the first side and the second side, at least one of the lateral walls comprising an opening formed therein;
        a top extending over the first wall, the second wall, and the two lateral walls;
        a base opposite the top extending between the first wall, the second wall, and the two lateral walls, said base provided with one or more access portions for accessing one or more areas beneath the base;
    a second floor contained within an internal space of the frame, the second floor being controllably deployable between a lowered position and a raised position; and
    a loading ramp hingedly attached to a base of the at least one lateral side having the opening formed therein.

2. The transportable container of claim 1, wherein each of the two lateral walls comprises the opening formed therein and each of the two lateral walls comprises the loading ramp hingedly attached to the base thereof.

3. The transportable container of claim 1, wherein the second wall has an arcuate shape, the arc opening away from the first wall.

4. The transportable container of claim 3, wherein the second wall comprises a plurality of wall segments extending from each vertical edge thereof and angled decreasing toward the first wall to form the arcuate shape.

5. The transportable container of claim 1, further comprising an opening in the second wall.

6. The transportable container of claim 5, wherein the opening in the second wall is a doorway.

7. The transportable container of claim 1, wherein the first wall comprises a recess formed therein, the recess extending away from the second wall.

8. The transportable container of claim 1, wherein the second floor is controllably deployable by way of a hoist system.

9. The transportable container of claim 8, wherein the hoist system is a two- or four-post hydraulic hoist system.

10. The transportable container of claim 8, wherein the hoist system is configured to raise and lower a weight of about 2000 lbs.

11. The transportable container of claim 1, wherein the frame is comprised of a plurality of metal or metal alloy support beams.

12. The transportable container of claim 11, wherein the frame is comprised of a plurality of steel or aluminum-containing alloy support beams.

* * * * *